(12) United States Patent
Gao (10) Patent No.: US 10,638,496 B2
(45) Date of Patent: *Apr. 28, 2020

(54) METHOD AND APPARATUS FOR GROUP MANAGEMENT DURING MACHINE-TO-MACHINE COMMUNICATION

(71) Applicant: Huawei Technologies Co., Ltd., Shenzhen (CN)

(72) Inventor: Ying Gao, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/297,372

(22) Filed: Mar. 8, 2019

(65) Prior Publication Data

US 2019/0208529 A1 Jul. 4, 2019

Related U.S. Application Data

(63) Continuation of application No. 14/718,351, filed on May 21, 2015, now Pat. No. 10,244,549, which is a
(Continued)

(51) Int. Cl.
*H04W 4/70* (2018.01)
*H04W 72/12* (2009.01)
(Continued)

(52) U.S. Cl.
CPC .......... *H04W 72/121* (2013.01); *H04W 4/08* (2013.01); *H04W 4/70* (2018.02); *H04L 51/00* (2013.01);
(Continued)

(58) Field of Classification Search
CPC ....... H04W 4/005; H04W 4/08; H04W 4/001; H04L 51/00; H04L 67/1044
See application file for complete search history.

(56) References Cited

U.S. PATENT DOCUMENTS 8,818,946 B2 * 8/2014 Foti ......................... H04W 4/70
707/632
2008/0009303 A1 1/2008 Westman et al.
(Continued)

FOREIGN PATENT DOCUMENTS

CN 101860807 A 10/2010
CN 101938705 A 1/2011
(Continued)

OTHER PUBLICATIONS

"Machine-to-Machine Communications (M2M); Functional Architecture," ETSI TS 102 690 V1.1.9, Sep. 2012, 280 pages.
(Continued)

*Primary Examiner* — Faruk Hamza
*Assistant Examiner* — Aixa A Guadalupe Cruz
(74) *Attorney, Agent, or Firm* — Slater Matsil, LLP (57) ABSTRACT

A system and method for group management during making-to-machine communication, the method including receiving, by a group server and from a requesting apparatus, a group creation request for a group and that carries at least group type information indicating a group type of the group, checking whether a member type of each member of the group is consistent with the group type carried in the group creation request, determining whether at least one member of the group is unreachable, setting a value of a consistency check flag of the group according to whether any member of the group is unreachable, and returning, to the requesting apparatus, a group creation response comprising information indicating the consistency check flag of the group.

20 Claims, 7 Drawing Sheets

Related U.S. Application Data continuation of application No. PCT/CN2012/085062, filed on Nov. 22, 2012.

(51) Int. Cl.
*H04W 4/08* (2009.01)
*H04L 29/08* (2006.01)
*H04L 12/58* (2006.01)
*H04W 84/18* (2009.01)

(52) U.S. Cl.
CPC ........ *H04L 67/1044* (2013.01); *H04W 84/18* (2013.01)

(56) References Cited

U.S. PATENT DOCUMENTS

| | | |
|---|---|---|
| 2011/0123755 A1 | 5/2011 | Brown et al. |
| 2011/0268047 A1 | 11/2011 | Nath et al. |
| 2012/0142268 A1 | 6/2012 | Tao et al. |
| 2012/0252518 A1* | 10/2012 | Karampatsis ......... H04W 68/00 455/515 |
| 2013/0029716 A1 | 1/2013 | Lee et al. |
| 2013/0343256 A1 | 12/2013 | Zakrzewski |
| 2013/0346504 A1 | 12/2013 | Huang et al. |

FOREIGN PATENT DOCUMENTS

| | | |
|---|---|---|
| CN | 102130773 A | 7/2011 |
| CN | 102170641 A | 8/2011 |
| CN | 102487483 A | 6/2012 |
| FI | 20065479 | 7/2006 |
| WO | 2011129575 A2 | 10/2011 |
| WO | 2012111255 A1 | 8/2012 |

OTHER PUBLICATIONS

"Machine-to-Machine Communications (M2M); mIa, dIa and mId Interfaces," ETSI TS 102 921 V1.1.1, Feb. 2012, 538 pages.

* cited by examiner

METHOD AND APPARATUS FOR GROUP MANAGEMENT DURING MACHINE-TO-MACHINE COMMUNICATION

CROSS-REFERENCE TO RELATED APPLICATIONS

This application is a continuation of U.S. patent application Ser. No. 14/718,351, filed on May 21, 2015, which is a continuation of International Application No. PCT/CN2012/085062, filed on Nov. 22, 2012. The aforementioned patent applications are hereby incorporated by reference in their entireties.

TECHNICAL FIELD

The present invention relates to the field of information technologies, and in particular, to a method and an apparatus for group management during machine-to-machine communication.

BACKGROUND

Machine-to-machine communication (M2M) is a network based application and service focusing on intelligent interaction between machines. By embedding a wireless or wired communication module and application processing logic in a machine, M2M implements information requirements of users in surveillance, commanding and scheduling, data collection, and measurement operations. In an M2M system, all types of M2M devices, such as various sensors for example, are connected to an M2M service platform directly via an M2M gateway. Thereby, different M2M services are implemented, such as electric meter reading and intelligent traffic control. Data collected by M2M devices can be acquired or M2M devices can be controlled and managed through service capabilities provided by the M2M service platform.

There are many types of M2M devices, such as an application type, an access right type, and a management object type. M2M devices can be grouped and each group has a group type to indicate the type of members in the group. If all members of a group belong to one type, the type of the group is this consistent type. If the members of a group belong to different types, the type of the group is a hybrid type.

In a prior art, M2M services always require group operations on a group of devices of the same type without expecting other types of members in the group to participate in the operation. When a group server receives a group creation request or group update request, the group server checks the type of members in the group. A failure of the check will immediately lead to a failure of group creation or group update. Yet the check failure may be a result of many causes. For example, some member devices in the group may be dormant and as a result cannot be checked. Therefore, the probability of the group creation or group update failure is high, which hinders the flexibility of use.

SUMMARY

To overcome the disadvantage of the prior art, embodiments of the present invention provide a method and an apparatus for group management during machine-to-machine communication, to increase the flexibility of creating and using M2M groups.

According to a first aspect, an embodiment of the present invention provides a method for group management during machine-to-machine communication, including receiving a group creation request sent by a requesting apparatus, where the group creation request carries a group type of a group requested to be created, checking consistency between member types of members in the group and the group type and setting a consistency check flag of the group according to a consistency check result, and returning a group creation response that carries the consistency check result to the requesting apparatus.

In a first implementation of the first aspect, the method further includes determining that the member type of one member in the group is inconsistent with the group type, and deleting the member whose member type is inconsistent with the group type from the group or deleting the group directly.

In a second implementation of the first aspect, attributes of the group include a consistency policy and the method further includes determining, according to the consistency policy, whether to delete a member whose member type is inconsistent with the group type from the group or delete the created group when it is determined that the member type of the member in the group is inconsistent with the group type.

In a third implementation of the first aspect, the checking consistency between member types of members in the group and the group type includes determining that a member in the group is unreachable, subscribing to an online status of a home device of the unreachable member from a service platform, and when the online status changes, receiving a notification message sent by the service platform, or polling the home device of the unreachable member periodically until the unreachable member is reachable, and after determining that the member is reachable, obtaining the member type of the reachable member and determining consistency between the member type of the reachable member and the group type.

In a fourth implementation of the first aspect, the checking consistency between member types of members in the group and the group type includes determining that a member in the group is a non-subgroup member and determining the member type according to a uniform resource identifier (URI) of the member, and after determining the member type of the member, determining consistency between the member type of the member and the group type.

In a fifth implementation of the first aspect, the checking consistency between member types of members in the group and the group type includes determining that the consistency check of a subgroup member in the group is uncompleted, subscribing to a status of a subgroup from a home device of the subgroup, and receiving a status notification of the subgroup, determining the type of the subgroup according to the status notification, and determining consistency between the type of the subgroup and the group type.

In a sixth implementation of the first aspect, when the group type is a non-hybrid type, the method further includes checking consistency between the member type of members in the group and the group type.

According to a second aspect, an embodiment of the present invention provides a method for group management during machine-to-machine communication, including sending a group creation request to a group server, where the group creation request carries a group type of a group requested to be created, and receiving a returned group creation response, where the group creation response carries a result of a consistency check between member types of members in the group and the group type.

In a first implementation of the second aspect, the method further includes subscribing to a status of the group from the group server according to the group creation response.

According to a third aspect, an embodiment of the present invention provides a group server for machine-to-machine communication, including a processor and a non-transitory computer readable medium coupled to the processor and storing thereon computer-executable instructions that when executed by the processor, configure the group server to receive a group creation request sent by a requesting apparatus, where the group creation request carries a group type of a group requested to be created, check consistency between member types of members in the group and the group type and set a consistency check flag of the group according to a consistency check result, and return a group creation response that carries the consistency check result to the requesting apparatus.

In a first implementation of the third aspect, the group server further includes a policy unit, configured to when it is determined that the member type of one member in the group is inconsistent with the group type, delete the member whose member type is inconsistent with the group type from the group or delete the group directly.

In a second implementation of the third aspect, attributes of the group include a consistency policy and the policy unit further determines, according to the consistency policy, whether to delete a member whose member type is inconsistent with the group type from the group or delete the created group when it is determined that the member type of the member in the group is inconsistent with the group type.

In a third implementation of the third aspect, the group server further includes a subscribing unit, configured to subscribe to an online status of a home device of an unreachable member in the group from a service platform when the member is determined to be unreachable, and when the online status changes, receive a notification message sent by the service platform, and the consistency check unit obtains the member type of the member after determining that the member is reachable and determines consistency between the member type of the member and the group type.

In a fourth implementation of the third aspect, the consistency check unit is configured to determine that a member of the group is a non-subgroup member and determine the member type according to a uniform resource identifier URI of the member, and determine consistency between the member type of the member and the group type after determining the member type.

In a fifth implementation of the third aspect, the group server further includes a subscribing unit, configured to when it is determined that the consistency check of a subgroup member in the group is uncompleted, subscribe to a status of a subgroup from a home device of the subgroup and receive a status notification of the subgroup, and the consistency check unit determines the type of the subgroup according to the status notification and determines consistency between the type of the subgroup and the group type.

According to a fourth aspect, an embodiment of the present invention provides a requesting apparatus for machine-to-machine communication, including a processor and a non-transitory computer readable medium coupled to the processor and storing thereon computer-executable instructions that when executed by the processor, configure the requesting apparatus to send a group creation request to a group server, where the group creation request carries a group type of a group requested to be created, and receive a returned group creation response, where the group creation response carries a result of a consistency check between member types of members in the group and the group type.

In a first implementation of the fourth aspect, the requesting apparatus further includes a subscribing unit, configured to subscribe to a status of the group from the group server according to the group creation response.

In the embodiments of the present invention, by setting the consistency check flag of a group and notifying the requesting apparatus of the consistency check flag in a group creation response, the creation of the group will not fail because of type check, which greatly increases the flexibility of using the M2M technology.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
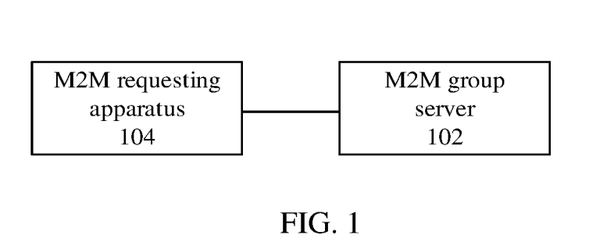
FIG. 1 is a system architecture diagram for group management according to an embodiment of the present invention.

An embodiment of the present invention provides a system for M2M group management. As shown in FIG. 1, the system for M2M group management includes a group server 102 and a requesting apparatus 104.

The group server 102 is configured to receive a group creation request sent by the requesting apparatus 104, where the group creation request carries a group type of a group requested to be created, check consistency between member types of members in the group and the group type and set a consistency check flag of the group according to a consistency check result, and return a group creation response that carries the consistency check result to the requesting apparatus.

The requesting apparatus 104 is configured to send the group creation request to the group server 102 and receive the returned group creation response, where the group creation response carries the result of the consistency check between the member types of members in the group and the group type.

In the embodiment of the present invention, the group server 102 may be a service platform, an M2M gateway, or an M2M device that can store and maintain groups and a created group is homed to the group server 102. The requesting apparatus 104 may also be a service platform, an M2M gateway, or an M2M device and a group that the requesting apparatus requests to create is in the group server 102.

Figure 2:
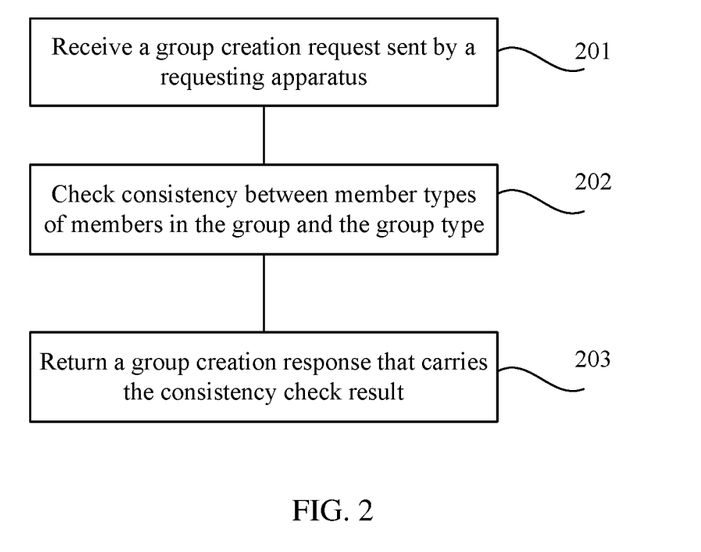
FIG. 2 is a flowchart of a method for group management according to an embodiment of the present invention.

An embodiment of the present invention provides a method for M2M group management. As shown in FIG. 2, the method includes the following steps.

201. A group server receives a group creation request sent by a requesting apparatus, where the group creation request carries a group type of a group requested to be created. The group creation request carries the group type and optionally may carry information such as a group identifier and group members.

202. The group server checks consistency between member types of members in the group and the group type and sets a consistency check flag of the group according to a consistency check result.

For subgroup members in the group, the group server may obtain the "group type" attribute of a subgroup. For non-subgroup members in the group, the group server may determine their member types according to the uniform resource identifier (URI) of each member. For example, the URI of one member is "coap://gg1.example.com/applications/temp1", where "applications" indicates that the type of the member is an "application" type. After determining the member types, the group server further determines the consistency between the member types and the group type.

When the group type is hybrid, the group server does not need to check consistency between member types of members in the group and the group type.

Preferably, when the group server determines that the type of one member in the group is inconsistent with the group type, the group server may delete the member whose member type is inconsistent with the group type from the group or delete the created group directly. Further, a consistency policy may be included in the group attributes for determining whether to delete the member whose member type is inconsistent with the group type or delete the created group when it is determined that the member type of one member in the group is inconsistent with the group type.

Optionally, when the group server determines that a member in the group is unreachable, the group server may subscribe to the online status of the unreachable member from a service platform where a home device of the unreachable member is registered, and when the home device of the unreachable member is online, the service platform sends a notification message to the subscriber. Or, the group server polls the home device of the unreachable device periodically until the device is reachable and then obtains the member type of the member and determines its consistency with the group type.

Optionally, when a group member is unreachable, the group server may first obtain the member type of the group member from a cached record and determine consistency between the member type of the member and the group type. After the member is reachable, the group server further determines consistency between the member type and the group type.

The group server may first create the group and set the consistency check flag of the group according to the consistency check result. If all members are reachable and checked, the consistency check flag may be set to "check completed". If the consistency check of some members is uncompleted for reasons such as unreachability, the flag may be set to "check uncompleted".

The unreachable member may be first recorded and its consistency is checked after it is reachable.

203. The group server returns a group creation response that carries the consistency check result to the requesting apparatus.

If the consistency check is uncompleted, the group server includes a "check uncompleted" flag in the group creation response to notify the M2M requesting apparatus. If the group consistency check is successful and the creation is successful, the group server may include a success flag in the group creation response.

Figure 3:
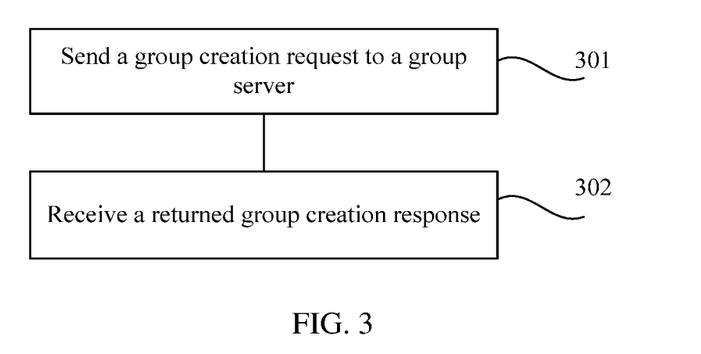
FIG. 3 is a flowchart of another method for group management according to an embodiment of the present invention.

An embodiment of the present invention provides another method for M2M group management. As shown in FIG. 3, the method includes the following steps.

301. Send a group creation request to a group server, where the group creation request carries a group type of a group requested to be created. The group creation request carries the group type and optionally may carry a group identifier or group members or other information.

302. Receive a returned group creation response, where the group creation response carries a result of a consistency check between member types of members in the group and the group type.

If the consistency check is uncompleted, the group server includes a "check uncompleted" flag in the group creation response to notify the M2M requesting apparatus. If the group consistency check is successful and the creation is successful, the group server may include a success flag in the group creation response.

The requesting apparatus may subscribe to the status of the group according to the received group creation response. After the status of the group changes on the group server, for example, after the consistency check is completed, the requesting apparatus may be notified.

Figure 4:
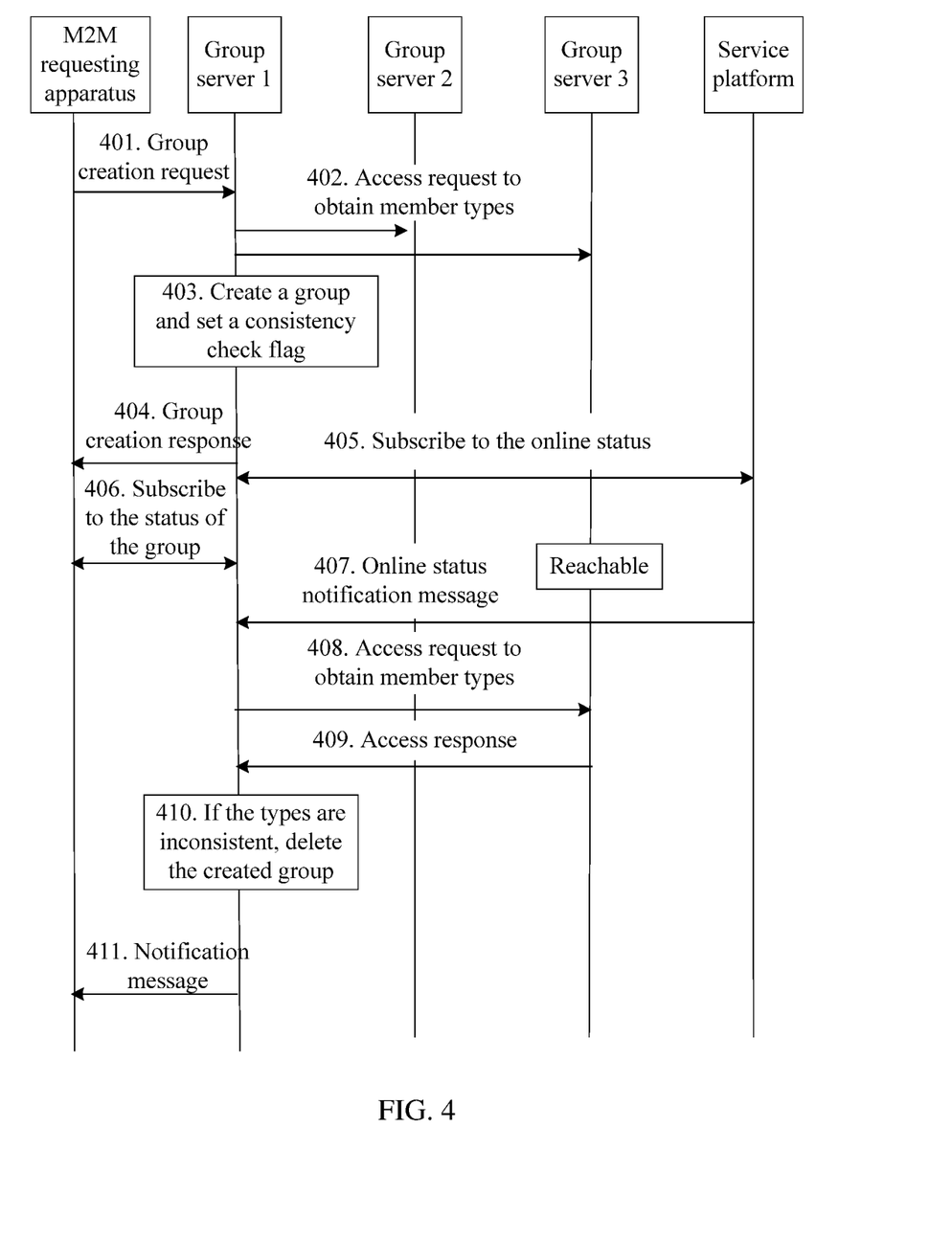
FIG. 4 is a flowchart of still another method for group management according to an embodiment of the present invention.

As shown in FIG. 4, an embodiment of the present invention also provides a method for group management. In the embodiment, as an example, group 1 needs to be created. Group 1 includes subgroup members such as subgroup 2 and subgroup 3 and device members such as device 4 and device 5. A specific procedure of the method includes the following steps.

401. A requesting apparatus sends a group creation request message, requesting to create group 1.

Herein, the requesting apparatus may be an M2M device, an M2M gateway, or a service platform, and the group server may be a home service capability layer (Service Capability Layer, SCL) device of the group, and the service platform may be an M2M SCL (SCL, Service Capability Layer) device. For example, in the embodiment, group 1 requested to be created is homed to SCL device 1, which is group server 1, and subgroup 2 and subgroup 2 are homed respectively to SCL device 2 and SCL device 3, which are group server 2 and group server 3. The two device members of group 1, device 4 and device 5, are also homed to SCL device 1.

The group creation request carries the group type of the group requested to be created. The embodiment assumes this type is a non-hybrid type, such as an application type, which indicates that all group members should belong to a consistent type.

After receiving the group creation request, group server 1 checks consistency between member types of members in the group and the group type.

After receiving the group creation request, the group server determines, according to the group type, whether consistency check is necessary. If the group type is hybrid, consistency check is unnecessary. The embodiment assumes that consistency check is necessary.

The group server obtains the member types of all members in a group member list. The types of local group members may be obtained directly for comparison. If the group includes a remote group member, the group server needs to obtain the member type of the member from the home device of the remote member.

Whether the group includes a remote group member may be determined according to the uniform resource identifier URI of the group. For example, in the embodiment, it is assumed that the domain names of group servers 1, 2, and 3 are g1.example.com, d1.example.com, and d2.example.com, respectively. The URI of group 1 is "coap://g1.example.com/groups/group1", that of subgroup 2 is "coap://d1.example.com/groups/group2", and that of subgroup 3 is "coap://d2.example.com/groups/group3". This indicates that group 1 and subgroups 2 and 3 have different home devices and that subgroups 2 and 3 are remote group members of group 1.

In the embodiment, it is assumed that the two device members of group 1, device 4 and device 5, are local members whose member types can be directly obtained for consistency check. Subgroup 2 and subgroup 3 are remote members. Herein, the embodiment assumes that subgroup 2 and subgroup 3 have not passed the member type consistency check because, group server 1, after sending access requests respectively to the home group server 2 and group server 3 of subgroup 2 and subgroup 3, receives no access response to the access requests after a specified period of time. The access requests may be requests to access the type attribute of the group.

403. Group server 1 creates group 1 and sets one attribute of the group, the consistency check flag, to "check uncompleted" because the consistency check of subgroup 2 and subgroup 3 is not yet completed.

404. Group server 1 returns a group creation response to the requesting apparatus. The group creation response may carry the "consistency uncompleted" flag.

405. Group server 1 subscribes to the online status of the unreachable member from the service platform.

For an unreachable member, group server 1 may send a subscription request to the service platform. In the embodiment, group server 1 subscribes to the online status of the home group server 2 and group server 3 of subgroup 2 and subgroup 3. Because group server 2 and group server 3 are already registered with the service platform, the platform may return a subscription success response after receiving the subscription request.

406. The requesting apparatus subscribes to the status of the group.

After receiving the returned group creation response, the requesting apparatus may send a subscription request to group server 1 according to the "check uncompleted" flag carried in the response, requesting to subscribe to the status of group 1. Group server 1 may return a subscription success response after receiving the subscription request.

407. When group server 3 is reachable, its online status registered with the service platform is changed and the service platform sends a notification message to the subscriber, that is, group server 1, notifying that "group server 3 is reachable".

408. After receiving the notification message, group server 1 sends an access request to group server 3, requesting to obtain the group attributes of subgroup 3.

409. Group server 1 receives an access response returned by group server 3, where the group type of subgroup 3 is carried.

410. Group server 1 checks whether the group type of subgroup 3 is consistent with the group type of group 1, and if the types are inconsistent, as shown in FIG. 4, group server 1 deletes the created group 1.

411. The group server 1 sends a notification message. Because the requesting apparatus has subscribed to the status of group 1, group server 1 may notify the requesting apparatus that "group 1 is deleted due to inconsistency of the type of member 'subgroup'".

In the embodiment, by adding a consistency check flag in a group and notifying the requesting apparatus of the consistency check flag in a group creation response, the creation of the group does not fail because of type check, which greatly increases the flexibility of using the M2M technology.

Figure 5:
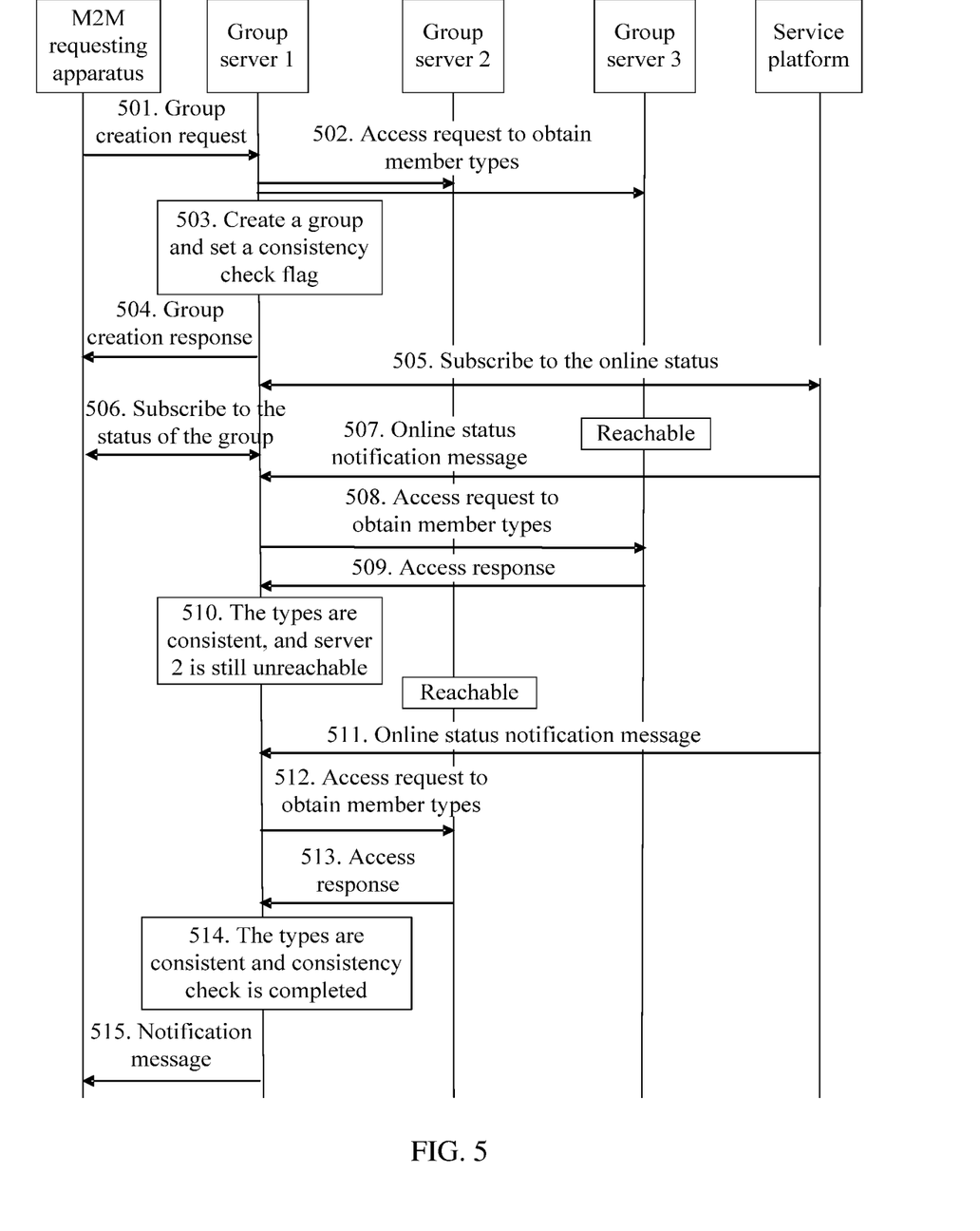
FIG. 5 is a flowchart of still another method for group management according to an embodiment of the present invention.

As shown in FIG. 5, an embodiment of the present invention provides another method for group management. This embodiment is similar to the embodiment shown in FIG. 4. In this embodiment, as an example, group 1 also needs to be created. Group 1 includes subgroup members such as subgroup 2 and subgroup 3 and device members such as device 4 and device 5. A specific procedure of the method includes the following steps.

501-509. The steps are the same as steps 401-409 in the embodiment shown in FIG. 4, that is, group server 1 receives a group creation request, creates a group, and returns a response. Group server 1 also subscribes to the online status of group server 2 and group server 3 from a service platform. After group server 3 is reachable, the group type of subgroup 3 is obtained.

510. Group server 1 checks whether the group type of subgroup 3 is consistent with the group type of group 1. It is assumed that, as shown in FIG. 5, the types are consistent in this example, but because group server 2 is unreachable, the group type of subgroup 2 is not obtained, and therefore, the consistency check flag of group 1 is still "uncompleted".

511. When group server 2 is reachable, its resource online status registered with the service platform is changed and the service platform sends a notification message to the subscriber, i.e. group server 1, notifying that "group server 2 is reachable".

512. After receiving the notification message, group server 1 sends an access request to group server 2, requesting to obtain the group attributes of subgroup 2.

513. Group server 1 receives an access response returned by group server 2, where the group type of subgroup 2 is carried.

514. Group server 1 checks whether the group type of subgroup 2 is consistent with the group type of group 1. It is assumed that, as shown in FIG. 5, the types are consistent in this example. Then the consistency check of all members of group 1 is completed, and therefore, group server 1 sets the consistency check flag of group 1 to "completed". Herein, the member types of all members are consistent with the group type of the group.

515. The group server 1 sends a notification message. Because the requesting apparatus has subscribed to the status of group 1, group server 1 may notify the requesting apparatus that "consistency check of group 1 is completed".

In the embodiment, by adding a consistency check flag in a group and notifying the requesting apparatus of the consistency check flag in a group creation response, the creation of the group does not fail because of type check, which greatly increases the flexibility of using the M2M technology.

Figure 6:
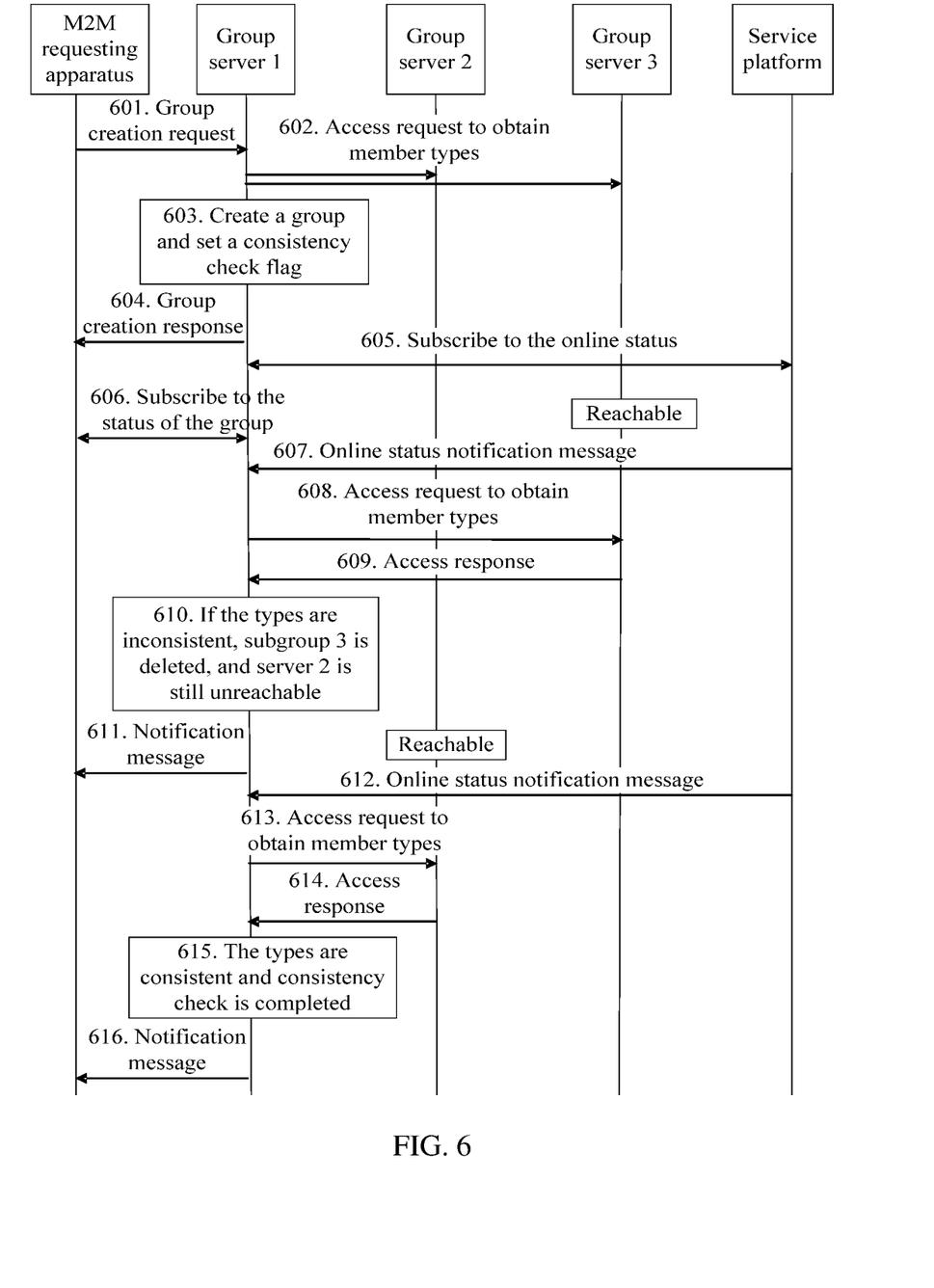
FIG. 6 is a flowchart of still another method for group management according to an embodiment of the present invention.

As shown in FIG. 6, an embodiment of the present invention provides another method for group management. This embodiment is similar to the embodiment shown in FIG. 4. In this embodiment, as an example, group 1 also needs to be created. Group 1 includes subgroup members such as subgroup 2 and subgroup 3 and device members such as device 4 and device 5. A specific procedure of the method includes the following steps.

601-609. The steps are the same as steps 401-409 in the embodiment shown in FIG. 4, that is, group server 1 receives a group creation request, creates a group, and returns a response. Group server 1 also subscribes to the online status of group server 2 and group server 3 from a service platform. After group server 3 is reachable, the group type of subgroup 3 is obtained.

610. Group server 1 checks whether the group type of subgroup 3 is consistent with the group type of group 1. It is assumed that, as shown in FIG. 6, the types are inconsistent in this example. Unlike the example shown in FIG. 4, group server 1 determines the processing according to one "consistency policy". For example, group server 1 may directly delete a created group, which is the same as that shown in FIG. 4. Or, group server 1 may delete a member whose type is inconsistent with the group type from the created group. Herein, for example, subgroup 3 is deleted from group 1. After the deletion, because group server 2 is unreachable, the group type of subgroup 2 cannot be obtained, and therefore, the consistency check of group 1 is "uncompleted".

The consistency policy may be configured on the group server or carried in the group creation request of the requesting apparatus, and after receiving the consistency policy, the group server applies the consistency policy to the group requested to be created. If the consistency policy is "deleting group", the group server deletes the group after determining that the type of one member in the group is inconsistent with the group type. If the consistency policy is "deleting member", the group server deletes the member of an inconsistent type from the group after determining that the type of one member in the group is inconsistent with the group type.

611. The group server 1 sends a notification message. Because the requesting apparatus has subscribed to the status of group 1, group server 1 may notify the requesting apparatus that "the type of one member 'subgroup 3' of group 1 is inconsistent with the group type and the member is deleted from the group" and may also notify that the consistency check is still "uncompleted".

612. When group server 2 is reachable, its resource online status registered with the service platform is changed and the service platform sends a notification message to the subscriber, that is, group server 1, notifying that "group server 2 is reachable".

613. After receiving the notification message, group server 1 sends an access request to group server 2, requesting to obtain the group attributes of subgroup 2.

614. Group server 1 receives an access response returned by group server 2, where the group type of subgroup 2 is carried.

615. Group server 1 checks whether the group type of subgroup 2 is consistent with the group type of group 1. It is assumed that, as shown in FIG. 5, the types are consistent in this example. Then the consistency check of all members of group 1 is completed, and therefore, group server 1 sets the consistency check flag of group 1 to "completed". Herein, the member types of all members are consistent with the group type of the group.

616. The group server 1 sends a notification message. Because the requesting apparatus has subscribed to the status of group 1, group server 1 may notify the requesting apparatus that the consistency check is "completed."

In the embodiment, by adding a consistency policy in a group, the flexibility of consistency processing in group creation is further improved, which increases the flexibility of using the M2M technology.

Figure 7:
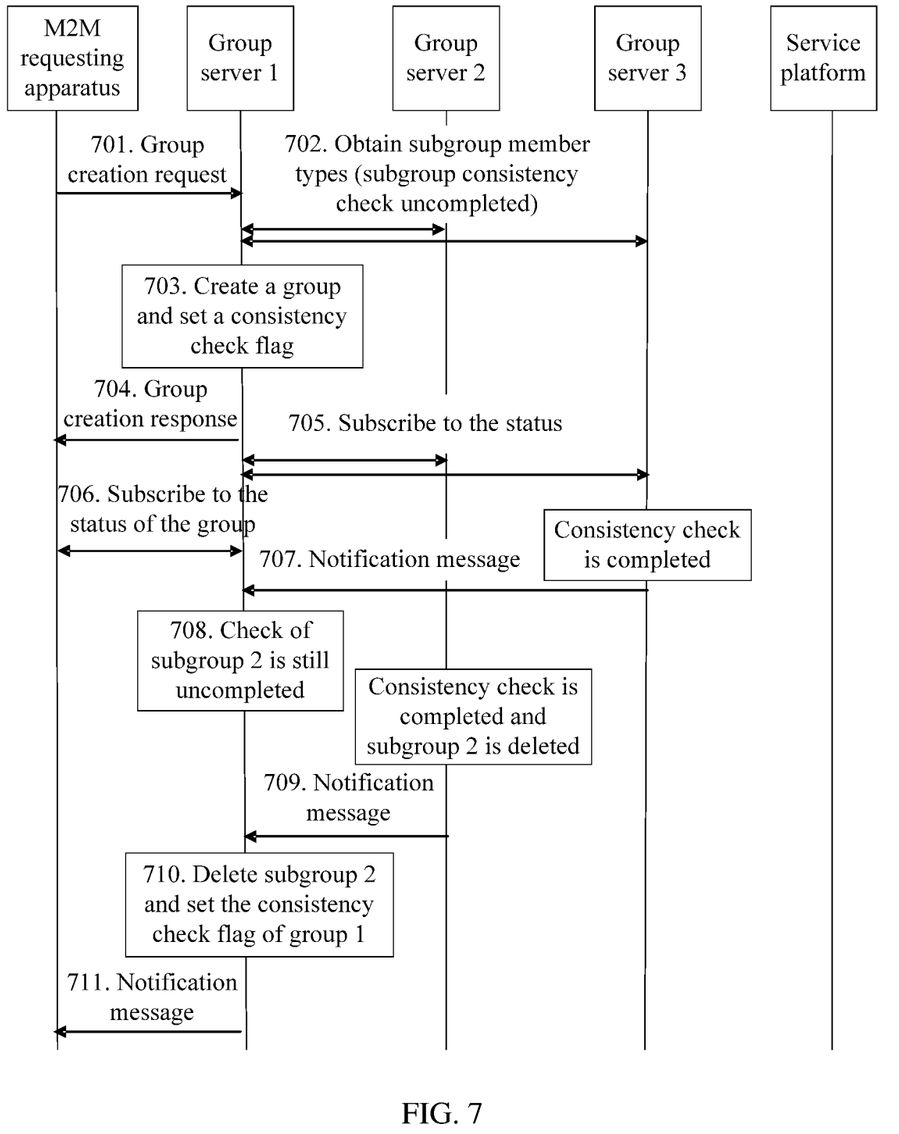
FIG. 7 is a flowchart of still another method for group management according to an embodiment of the present invention.

As shown in FIG. 7, an embodiment of the present invention provides another method for group management. In the embodiment, the type of a subgroup is also pending consistency check because a member of the subgroup is unreachable. This embodiment is similar to the foregoing embodiment. In this embodiment, as an example, group 1 needs to be created. Group 1 includes subgroup members such as subgroup 2 and subgroup 3 and device members such as device 4 and device 5. A specific procedure of the method includes the following steps.

701. A requesting apparatus sends a group creation request message, requesting to create group 1.

Herein, the requesting apparatus may be an M2M device, an M2M gateway, or a service platform and the group server may be a home service capability layer (Service Capability Layer, SCL) device of the group, and the service platform may be an M2M SCL (SCL, Service Capability Layer) device. For example, in the embodiment, group 1 requested to be created is homed to SCL device 1, which is group server 1, and subgroup 2 and subgroup 2 are homed respectively to SCL device 2 and SCL device 3, which are group server 2 and group server 3. The two device members of group 1, device 4 and device 5, are also homed to SCL device 1.

The group creation request carries the group type of the group requested to be created. The embodiment assumes this type is a non-hybrid type, such as an application type, which indicates that all group members should belong to a consistent type.

702. After receiving the group creation request, group server 1 checks consistency between member types of members in the group and the group type.

After receiving the group creation request, the group server determines, according to the group type, whether consistency check is necessary. If the group type is hybrid, consistency check is unneeded. The embodiment assumes that consistency check is needed.

The group server obtains the member types of all members in a group member list. The types of local group members may be obtained directly for comparison. If the group includes a remote group member, the group server needs to obtain the member type of the member from the home SCL device of the remote member.

In the embodiment, it is assumed that the two device members of group 1, device 4 and device 5, are local members, whose member type can be directly obtained for consistency check. Subgroup 2 and subgroup 3 are remote members and it is assumed that subgroup 2 and subgroup 3 have not passed the member type consistency check. Unlike the embodiment shown in FIG. 4, group server 1 sends access requests respectively to the home group server 2 and group server 3 of subgroup 2 and subgroup 3, requesting to obtain the type attribute of the subgroups, and then receives the access responses returned by subgroup 2 and subgroup 3, where the responses include parameters indicating that the consistency check of subgroup 2 and subgroup 3 is "uncompleted". A possible reason why the check of the subgroups is uncompleted is that some members in the subgroups are currently unreachable.

703. Group server 1 creates group 1 and sets the consistency check flag of the group to "uncompleted" because the consistency check of subgroup 2 and subgroup 3 is not yet completed.

704. Group server 1 returns a group creation response to the requesting apparatus. The group creation response may carry the consistency check flag attribute of the group, which, in the embodiment, is "uncompleted".

705. Group server 1 subscribes to the status of subgroups whose consistency check is uncompleted respectively from group server 2 and group server 3.

For a subgroup whose consistency check is uncompleted, group server 1 may send a subscription request to the home group server of the subgroup. In the embodiment, group server 1 subscribes to the status of subgroup 2 and subgroup 3 from group server 2 and group server 3 respectively.

706. The requesting apparatus subscribes to the status of the group.

After receiving the returned group creation response, the requesting apparatus may send a subscription request to group server 1 according to the consistency check "uncompleted" flag carried in the response, requesting to subscribe to the status of group 1. After the status of group 1 changes, group server 1 may notify the requesting apparatus. Group server 1 may return a subscription success response after receiving the subscription request.

707. Receive a notification message from group server 3.

After the consistency check of subgroup 3 is completed, for example, after the unreachable members of subgroup 3 are reachable, group server 3 may proceed according to the "consistency policy" of subgroup 3. Herein, it is assumed that subgroup 3 includes a member of an inconsistent type and that the "consistency policy" is "deleting member when inconsistent". Then, subgroup 3 deletes the inconsistent member from subgroup 3. After the deletion, the consistency check flag of subgroup 3 is "completed". Because group server 1 has subscribed to the status change of subgroup 3, group server 3 sends a notification message to the subscriber, that is, group server 1, notifying that "the consistency check of subgroup 3 is completed".

708. Group server 1 checks whether the group type of subgroup 3 is consistent with the group type of group 1. In the embodiment, it is assumed that the types are inconsistent and that the "consistency policy" of group 1 is "deleting member when inconsistent". Then, group server 1 deletes subgroup 3 from group 1. After the deletion, because group server 2 has not yet completed consistency check, the consistency check of group 1 is still uncompleted.

709. Receive a notification message from group server 2.

After the consistency check of subgroup 2 is completed, for example, after the unreachable members of subgroup 2 are reachable, group server 2 may proceed according to the "consistency policy" of subgroup 2. Herein, it is assumed that subgroup 2 includes a member of an inconsistent type and that the "consistency policy" is "deleting group when inconsistent". Then, group server 2 deletes subgroup 2 directly. Because group server 1 has subscribed to the status change of subgroup 2, group server 2 sends a notification message to the subscriber, that is, group server 1, notifying that "subgroup 2 is deleted".

710. After receiving the notification that "subgroup 2 is deleted", group server 1 deletes subgroup 2 from group 1. Now the consistency check of all members of group 1 is completed, and therefore the consistency check flag of group 1 is set to "completed". Herein, the member types of all members are consistent with the group type of the group.

711. The group server 1 sends a notification message. Because the requesting apparatus has subscribed to the status of group 1, group server 1 may notify the requesting apparatus that the consistency check is "completed" and further notify that "subgroup 2 is deleted and subgroup 3 is deleted".

Figure 8:
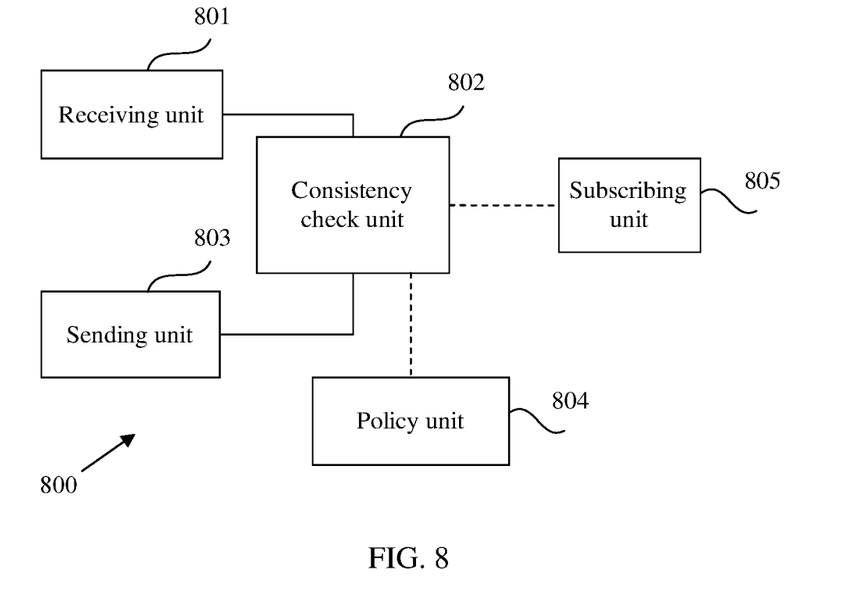
FIG. 8 is a schematic structural diagram of a group server according to an embodiment of the present invention.

FIG. 8 is a schematic diagram of a group server 80o for machine-to-machine communication according to an embodiment of the present invention. The group server 800 includes a receiving unit 801 configured to receive a group creation request sent by a requesting apparatus, where the group creation request carries a group type of a group requested to be created, a consistency check unit 802 configured to check consistency between member types of members in the group and the group type and set a consistency check flag of the group according to a consistency check result, and a sending unit 803 configured to return a group creation response that carries the consistency check result to the requesting apparatus. The consistency check unit 802 is coupled to the receiving unit 801 and to the sending unit 803.

Optionally, the group server 80o may further include a policy unit 804 coupled to the consistency check unit 802. The policy unit 804 may be configured to, when it is determined that the member type of one member in the group is inconsistent with the group type, delete the member that is inconsistent with the group type from the group or delete the group directly.

Optionally, attributes of the group include a consistency policy. The policy unit further determines, according to the consistency policy, whether to delete a member whose member type is inconsistent with the group type from the group or delete the created group when it is determined that the member type of the member in the group is inconsistent with the group type.

Optionally, the group server further includes a subscribing unit 805 coupled to the consistency check unit 802. The subscribing unit 805 may be configured to subscribe to an online status of a home device of an unreachable member from a service platform when the member in the group is determined to be unreachable. When the online status changes, the subscribing unit 805 receives a notification message sent by the service platform. The consistency check unit 802 obtains the member type of the member after determining that the member is reachable and determines consistency between the member type of the member and the group type.

Optionally, the consistency check unit 802 is configured to determine that a member of the group is a non-subgroup member, determine the member type according to a uniform resource identifier URI of the member, and determine consistency between the member type of the member and the group type after determining the member type.

Optionally, the subscribing unit 805 is configured to, when it is determined that the consistency check of a subgroup member in the group is uncompleted, subscribe to the status of the subgroup from a home device of the subgroup and receive a status notification of the subgroup, and the consistency check unit determines the type of the subgroup according to the status notification and determines consistency between the type of the subgroup and the group type.

Figure 9:
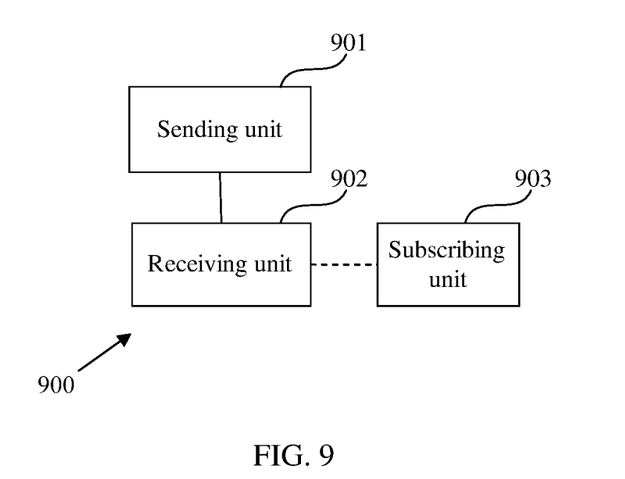
FIG. 9 is a schematic structural diagram of a requesting apparatus according to an embodiment of the present invention.

FIG. 9 is a schematic diagram of a requesting apparatus 900 for machine-to-machine communication according to an embodiment of the present invention. The requesting apparatus 900 includes a sending unit 901 configured to send a group creation request to a group server, where the group creation request carries a group type of a group requested to be created, and a receiving unit 902 configured to receive a returned group creation response, where the group creation response carries a result of a consistency check between member types of members in the group and the group type. The receiving unit 902 is coupled to the sending unit 901.

Optionally, the requesting apparatus further includes a subscribing unit 903 coupled to the receiving unit 902. The subscribing unit 903 may be configured to subscribe to the status of the group from the group server according to the group creation response.

Figure 10:
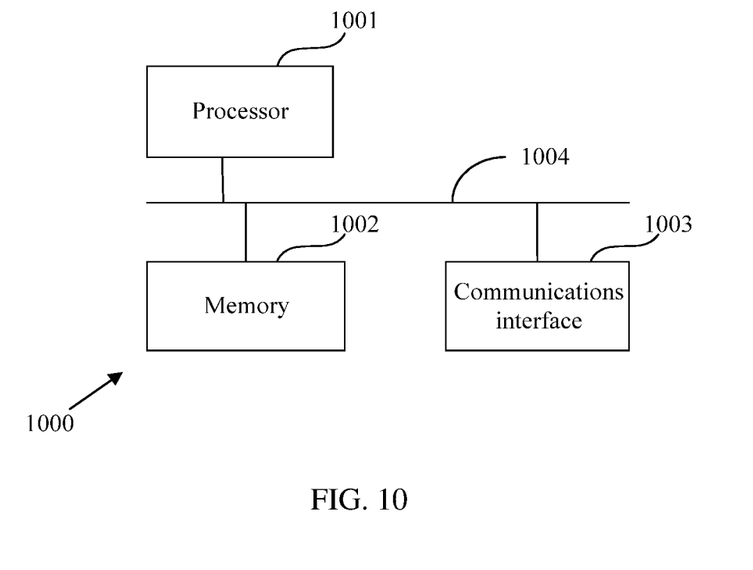
FIG. 10 is a schematic structural diagram of another group server according to an embodiment of the present invention.

FIG. 10 is another schematic structural diagram of a group server 1000 according to an embodiment of the present invention. The group server includes a bus, a processor 1001, a memory 1002, and a communication interface 1003. The group server 1000 adopts a general computer system structure, where program codes that execute the solution of the present invention are stored in the memory 1002 and the execution is controlled by the processor 1001.

The bus 1004 may include a closed circuit that transfers information between different pails of the computer.

The processor 1001 may be a general central processing unit (CPU), a microprocessor, an application-specific integrated circuit (ASIC), or one or more integrated circuits used to control the execution of the solution program of the present invention. The memory 1002 included in the computer system may be a read-only memory (ROM) or other types of static memory devices able to store static information and instructions, or a random access memory (RAM) or other types of dynamic memory devices able to store information and instructions, or a magnetic disk storage. The memory 1002 is connected to the processor 1001 via the bus 1004. The memory 1002 may comprise one or more memory devices 1002.

The communication interface 1003 may be any transceiver-like apparatus for communication with other devices or a communication network, such as an Ethernet, a radio access network (RAN), and a wireless local area network (WLAN).

The memory 1002, such as a RAM, stores an operating system and a program executing the solution of the present invention. The operating system is a program that controls the operation of other programs and manages system resources. The program codes that execute the solution of the present invention are stored in the memory 1002 and the execution is controlled by the processor 1001.

The program stored in the memory 1002 is used to instruct the processor 1001 to execute a method for group management during machine-to-machine communication, including receiving a group creation request sent by a requesting apparatus, where the group creation request carries a group type of a group requested to be created, checking consistency between member types of members in the group and the group type and setting a consistency check flag of the group according to a consistency check result, and returning a group creation response that carries the consistency check result to the requesting apparatus.

Optionally, the method further includes determining that the member type of one member in the group is inconsistent with the group type and deleting the member whose member type is inconsistent with the group type from the group or deleting the group directly.

Optionally, attributes of the group include a consistency policy and the method further includes determining, according to the consistency policy, whether to delete a member whose member type is inconsistent with the group type from the group or delete the created group when it is determined that the member type of the member in the group is inconsistent with the group type.

Optionally, the checking consistency between member types of members in the group and the group type includes determining that a member in the group is unreachable, subscribing to an online status of a home device of the unreachable member from a service platform, and when the online status changes, receiving a notification message sent by the service platform, or polling the home device of the unreachable member periodically until the unreachable member is reachable, after determining that the member is reachable, obtaining the member type of the member and determining consistency between the member type of the member and the group type.

Optionally, the checking consistency between member types of members in the group and the group type includes determining that a member in the group is a non-subgroup member and determining the member type according to a uniform resource identifier URI of the member, and after determining the member type of the member, determining consistency between the member type of the member and the group type.

Optionally, the checking consistency between member types of members in the group and the group type includes determining that the consistency check of a subgroup member in the group is uncompleted, subscribing to the status of a subgroup from a home device of the subgroup, receiving a status notification of the subgroup, determining the type of the subgroup according to the status notification, and determining consistency between the type of the subgroup and the group type.

Figure 11:
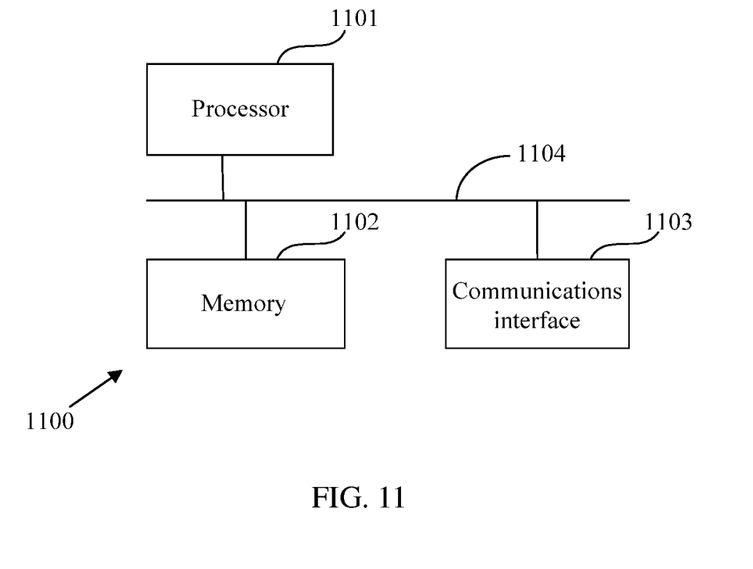
FIG. 11 is a schematic structural diagram of another requesting apparatus according to an embodiment of the present invention.

FIG. 11 is another schematic structural diagram of a requesting apparatus 1100 according to an embodiment of the present invention. The requesting apparatus includes a bus, a processor 1101, a memory 1102, and a communication interface 1103. The requesting apparatus 1100 adopts a general computer system structure, where program codes that execute the solution of the present invention are stored in the memory 1102 and the execution is controlled by the processor 1101.

The bus 1104 may include a closed circuit that transfers information between different pails of the computer.

The processor 1101 may be a general central processing unit (CPU), a microprocessor, an application-specific integrated circuit (ASIC), or one or more integrated circuits used to control the execution of the solution program of the present invention. The memory 1102 included in the computer system may be a read-only memory (ROM) or other types of static memory able to store static information and instructions, or a random access memory (RAM) or other types of dynamic memory able to store information and instructions, or a magnetic disk storage. The memory 1102 is connected to the processor 1101 via the bus 1104. The memory 1102 may comprise one or more memory devices 1102.

The communication interface 1103 may be any transceiver-like apparatus for communication with other devices or a communication network, such as an Ethernet, a radio access network (RAN), and a wireless local area network (WLAN).

The memory 1102, such as a RAM, stores an operating system and a program executing the solution of the present invention. The operating system is a program that controls the operation of other programs and manages system resources. The program codes that execute the solution of the present invention are stored in the memory 1102 and the execution is controlled by the processor 1101.

The program stored in the memory 1102 is used to instruct the processor 1101 to execute a method for group management during machine-to-machine communication, including sending a group creation request to a group server, where the group creation request carries a group type of a group requested to be created, and receiving a returned group creation response, where the group creation response carries a result of a consistency check between member types of members in the group and the group type.

Optionally, the method further includes subscribing to the status of the group from the group server according to the group creation response.

In any of the embodiments, the method and/or apparatus for group management during M2M communication is provided which increases the flexibility of creating and using M2M groups. In any of the embodiments, the method and/or apparatus for group management during M2M communication is provided wherein the creation of a group will not fail because of type check.

It should be noted that the embodiments herein are described in a progressive manner, where the similar or identical parts between the embodiments can be obtained by reference and the stress of each embodiment is different. Particularly, in the case of apparatus embodiments, because they are similar to the method embodiments, the description is simple, where the function execution processes of the units may be obtained by reference to the related parts of the method embodiments. The foregoing apparatus embodiments are exemplary. The units described as separated parts may be physically separated or physically not separated. The parts illustrated as units may or may not be physical units. This means that the parts may be located in one location or distributed in multiple network elements. The purpose of the technical solution of the embodiments may be achieved through a portion of or all modules described herein depending on the practical needs. Persons of ordinary skill in the art will understand and implement the technical solution of the present invention without creative labor.

To sum up, the foregoing embodiments are only some preferred embodiments of the present invention and not intended to limit the protection scope of the present invention. The present invention is intended to cover all modifications, equivalent replacements, and improvements made to the present invention without departing from the principle of the present invention.

What is claimed is:

1. A method for group management during machine-to-machine communication, the method comprising:
   receiving, by a group server and from a requesting apparatus, a group creation request for a group and that carries at least group type information indicating a group type of the group;
   checking whether a member type of each member of the group is consistent with the group type carried in the group creation request;
   determining whether at least one member of the group is unreachable;
   setting a value of a consistency check flag of the group according to whether any member of the group is unreachable; and
   returning, to the requesting apparatus, a group creation response comprising information indicating the consistency check flag of the group.

2. The method according to claim 1, further comprising:
   determining that an individual member type of a first member in the group is inconsistent with the group type; and
   deleting the group or the one member from the group in response to the individual member type of the first member being inconsistent with the group type.

3. The method according to claim 2, wherein attributes of the group comprise a consistency policy; and
   wherein the method further comprises:
      determining, according to the consistency policy, whether to delete the group or to delete the first member from the group.

4. The method according to claim 1, further comprising:
   subscribing to an online status of a home device of a second member of the group, wherein the second member of the group is a member of the group that is determined to be unreachable;
   receiving a notification message from the home device when an online status of the second member changes to reachable;
   obtaining an individual member type of the second member in response to receiving the notification message indicating that the second member is reachable; and
   checking whether the individual member type of the second member is consistent with the group type when the second member is reachable.

5. The method according to claim 4, further comprising:
   polling the home device of the second member periodically until the second member is reachable;
   obtaining an individual member type of the second member after second the member is reachable; and
   checking whether the individual member type of the second member is consistent with the group type in responds to the second member becoming reachable.

6. The method according to claim 1, wherein the checking whether the member type of each member of the group is consistent with the group type comprises:
   determining that the respective member of the group is a non-subgroup member;
   determining, in response to determining that the respective member is a non-subgroup member, an individual member type of the respective member according to a uniform resource identifier (URI) of the respective member; and checking whether the individual member type of the respective member is consistent with the group type.

7. The method according to claim 1, wherein the checking whether the member type of each member of the group is consistent with the group type comprises:
   determining, in response to a subgroup member in the group being unreachable, that a consistency check of the subgroup member is uncompleted, wherein the subgroup member is a member of a subgroup;
   subscribing to a status of the subgroup a home device of the subgroup;
   receiving a status notification of the subgroup;
   determining the member type of the subgroup according to the status notification; and
   checking whether the member type of the subgroup is consistent with the group type.

8. The method according to claim 1, further comprising:
   checking whether an individual member type of each member of the group is consistent with the group type when the group type is a non-hybrid type.

9. An apparatus for machine-to-machine communication, comprising:
   a processor; and
   a non-transitory computer-readable storage medium storing a program to be executed by the processor, the program including instructions to:
   receive, from a requesting apparatus, a group creation request for a group and that carries at least group type information indicating a group type of the group;
   check whether a member type of each member of the group is consistent with the group type carried in the group creation request;
   determine whether at least one member of the group is unreachable;
   set a value of a consistency check flag of the group according to whether any member of the group is unreachable; and
   return to the requesting apparatus, a group creation response comprising information indicating the consistency check flag of the group.

10. The apparatus according to claim 9, wherein the program further includes instructions to:
    determine that an individual member type of a first member in the group is inconsistent with the group type; and
    delete the group or the one member from the group in response to the individual member type of the first member being inconsistent with the group type.

11. The apparatus according to claim 10, wherein attributes of the group comprise a consistency policy; and
    wherein the program further includes instructions to:
    determine, according to the consistency policy, whether to delete the group or to delete the first member from the group.

12. The apparatus according to claim 9, wherein the program further includes instructions to:
    subscribe to an online status of a home device of a second member of the group, wherein the second member of the group is a member of the group that is determined to be unreachable;
    receive a notification message from the home device when an online status of the second member changes to reachable;
    obtain an individual member type of the second member in response to receiving the notification message indicating that the second member is reachable; and
    check whether the individual member type of the second member is consistent with the group type when the second member is reachable.

13. The apparatus according to claim 12, wherein the program further includes instructions to:
    polling the home device of the second member periodically until the second member is reachable;
    obtaining an individual member type of the second member after second the member is reachable; and
    checking whether the individual member type of the second member is consistent with the group type in responds to the second member becoming reachable.

14. The apparatus according to claim 9, wherein the program further includes instructions to:
    determine that the respective member of the group is a non-subgroup member;
    determine, in response to determining that the respective member is a non-subgroup member, an individual member type of the respective member according to a uniform resource identifier (URI) of the respective member; and
    check whether the individual member type of the respective member is consistent with the group type.

15. The apparatus according to claim 9, wherein the program further includes instructions:
    determine, in response to a subgroup member in the group being unreachable, that a consistency check of the subgroup member is uncompleted, wherein the subgroup member is a member of a subgroup;
    subscribe to a status of the subgroup a home device of the subgroup;
    receive a status notification of the subgroup;
    determine the member type of the subgroup according to the status notification; and
    check whether the member type of the subgroup is consistent with the group type.

16. The apparatus according to claim 9, wherein the program further includes instructions to:
    check whether an individual member type of each member of the group is consistent with the group type when the group type is a non-hybrid type.

17. An apparatus for machine-to-machine communication, comprising:
    a processor; and
    a non-transitory computer-readable storage medium storing a program to be executed by the processor, the program including instructions to:
    receive, from a requesting apparatus, a group creation request for a group and that carries at least group type information indicating a group type of the group and further indicating members of the group;
    check whether a member type of each of the members of the group is consistent with the group type carried in the group creation request;
    determine whether at least one member of the group is unreachable; and
    return to the requesting apparatus, a group creation response comprising information indicating whether any member of the group is unreachable.

18. The apparatus according to claim 17, wherein the program further includes instructions to:
    determine that an individual member type of a first member in the group is inconsistent with the group type; and
    determine, according to a consistency policy of the group, whether to delete the group or to delete the first member from the group;

delete the group or the one member from the group or deleting the group in response to the individual member type of the first member being inconsistent with the group type.

19. The apparatus according to claim 17, wherein the program further includes instructions to:
subscribe to an online status of a home device of a second member of the group, wherein the second member of the group is a member of the group that is determined to be unreachable;
poll the home device of the second member periodically until the second member is reachable;
determine when an online status of the second member changes to reachable;
obtain an individual member type of the second member in response to receiving the notification message indicating that the second member is reachable; and
check whether the individual member type of the second member is consistent with the group type when the second member is reachable.

20. The apparatus according to claim 17, wherein the program further includes instructions to:
determine that the respective member of the group is a non-subgroup member;
determine, in response to determining that the respective member is a non-subgroup member, an individual member type of the respective member according to a uniform resource identifier (URI) of the respective member; and
check whether the individual member type of the respective member is consistent with the group type.

* * * * *